United States Patent
Watanabe

(10) Patent No.: US 6,807,377 B1
(45) Date of Patent: Oct. 19, 2004

(54) PARALLEL OPTICAL TRANSMISSION/ RECEPTION MODULE

(75) Inventor: Takayuki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/129,407

(22) Filed: Aug. 5, 1998

(30) Foreign Application Priority Data

Apr. 16, 1998 (JP) .......................................... 10-106523

(51) Int. Cl.$^7$ ............................................. H04B 10/00
(52) U.S. Cl. ........................................ 398/154; 398/31
(58) Field of Search .......................... 714/700; 359/154, 359/158, 189, 135, 140; 398/154, 192, 214, 208, 155, 30, 31

(56) References Cited

U.S. PATENT DOCUMENTS

| | | | | |
|---|---|---|---|---|
| 4,581,770 A | * | 4/1986 | Haworth ...................... | 359/178 |
| 4,677,618 A | * | 6/1987 | Haas et al. .................. | 714/700 |
| 4,797,951 A | * | 1/1989 | Duxbury et al. ............. | 359/158 |
| 5,221,984 A | * | 6/1993 | Furuyama et al. .......... | 398/161 |
| 5,426,578 A | * | 6/1995 | Nakamura et al. ........... | 363/37 |
| 5,436,908 A | * | 7/1995 | Fluker et al. ............... | 714/700 |
| 5,521,736 A | * | 5/1996 | Swirhun et al. ............. | 398/154 |
| 5,652,767 A | * | 7/1997 | Kiyonaga et al. ........... | 327/144 |
| 5,796,501 A | * | 8/1998 | Sotom et al. ................ | 359/119 |
| 6,031,847 A | * | 2/2000 | Collins et al. ............... | 370/508 |
| 6,151,148 A | * | 11/2000 | Harano ........................ | 359/174 |
| 6,167,077 A | * | 12/2000 | Ducaroir et al. ............. | 370/476 |
| 6,252,692 B1 | * | 6/2001 | Roberts ....................... | 359/172 |

FOREIGN PATENT DOCUMENTS

| | | | |
|---|---|---|---|
| DE | 690 25 742 T2 | 3/1996 | ............ H04J/14/02 |
| EP | 0 659 001 A2 | 6/1995 | ........... H04L/25/14 |
| EP | 0123456 A2 * | 1/2000 | .................. 100/100 |

OTHER PUBLICATIONS

English Abstract of Japanese Patent Laid–Open No. 4–178047.
English Abstract of Japanese Patent Laid–Open No. 63–9246.

* cited by examiner

Primary Examiner—Jason Chan
Assistant Examiner—Christina Y. Leung
(74) Attorney, Agent, or Firm—Staas & Halsey LLP

(57) ABSTRACT

Parallel synchronous pattern signals are transmitted from other side in a plurality of parallel data channels. A skew data reception unit converts the received parallel pattern signals into electric signals in the respective parallel data channels. A skew detection circuit serves to detect the length of a skew between the parallel data channels. A skew correction circuit serves to correct and eliminate the skew in parallel data signals, transmitted from the other side, between the parallel data channels based on the detected skew. The data signals without skews are output from the skew data reception unit.

14 Claims, 12 Drawing Sheets

PARALLEL OPTICAL TRANSMISSION/RECEPTION MODULE

BACKGROUND OF THE INVENTION

1. Field of the Invention

The present invention relates to data transfer using parallel optical transmission, in particular, to a parallel optical reception module for receiving optical data signals through a plurality of parallel data channels, and/or a parallel optical transmission module for transmitting optical data signals through a plurality of parallel data channels.

2. Description of the Prior Art

In the field of computer systems, the improvement in calculation or processing capability is supposed to require faster and larger data transfer between computers. Faster data transfer has been realized by the establishment of data transfer using optical transmission. However, larger data transfer apparently has not yet been realized sufficiently.

The implementation of larger data transfer is supposed to require "parallel" optical transmission in data transfer. However, the parallel optical transmission has suffered from a problem such that skews or time lags could be generated between parallel data channels because of the difference in data transmission rate of optical fibers and in processing rate of photodetectors for converting optical signals to electric signals. The skew would make computers incapable of calculating or processing received data signals. The further the transferred data should reach, the larger the skew gets. Skews are obstacle to implementation of parallel optical transmission in data transfer.

SUMMARY OF THE INVENTION

It is accordingly an object of the present invention to provide a parallel optical transmission/reception module realizing a larger and longer data transfer using parallel optical transmission by detecting and/or correcting skews between parallel data channels.

According to a first aspect of the present invention, there is provided a parallel optical transmission module comprising a skew data transmission unit capable of transmitting parallel synchronous pattern signals for a plurality of parallel data channels.

According to a second aspect of the present invention there is provided a parallel optical reception module comprising a skew data reception unit capable of taking out parallel pattern signals synchronously transmitted from other side in a plurality of parallel data channels and detecting a skew between the data channels based on the parallel pattern signals.

With a combination of the above parallel optical transmission and reception modules, it is possible to easily detect a skew between the parallel data channels by transferring the parallel pattern signals in the respective parallel data channels. In this case, the parallel pattern signals preferably have wavelength different from that of parallel data signals transferred in the parallel data channels. Difference in wavelength between the pattern signal and data signal enables employment of a single optical fiber common to the transfer of the pattern signal and data signal.

The parallel pattern signals may be transferred with or without the transfer of the data signals. Accordingly, a skew can be detected prior to the transfer of the data signals, and even during the transfer of the data signals. When the parallel pattern signals are transferred along with the data signals, the pattern signals are multiplexed on the data signals. The parallel pattern signals having wavelength different from that of the data signals enables easy extraction of the parallel pattern signals from the multiplexed signals. If the transfer the parallel pattern signals is kept with or without the transfer of the data signals, a skew can be detected immediately after the skew has varied.

The parallel optical reception module may further comprise a skew correction circuit capable of correcting the skew of the data signal based on the skew detected by the skew data reception unit. The skew correction circuit serves to output the parallel data signals without skews. Accordingly, the parallel data may simultaneously be subjected to processing or calculation.

On the other hand, a parallel optical transmission module may comprise a skew data reception unit capable of taking out parallel pattern signals synchronously transmitted from other side in a plurality of parallel data channels and detecting a skew between the data channels based on the parallel pattern signals. In addition, the parallel optical transmission module may further comprise a data transmission circuit capable of transmitting parallel data signals with the skew corrected based on the skew detected by the skew data reception unit into the parallel data channels. If the parallel data signals are transmitted with time lags corresponding to the length of the detected skews, a parallel optical reception module can simultaneously receive the parallel data signals under the effect of the skews.

When the skew data reception unit is assembled in a parallel optical transmission module, the parallel data signals may be transmitted after the reception of the parallel pattern signals are confirmed. The transfer after the confirmation serves to inspect the connection between the parallel optical transmission and reception modules by optical transmission paths such as optical fibers. In this case, it is possible to apply Class 1 regulation in the laser safety regulation to the transmission of optical pattern signals while applying Class 4 regulation to the transmission of optical data signals, so that larger power may be obtained according to Class 4 regulation for data transmission, and at the same time, reduced requirements can be applied to handling of the modules according to Class 1 regulation. It is possible to realize an open fiber control system.

Further, according to a third aspect of the present invention, there is provided a determination circuit for a later data channel, capable of outputting a pattern signal in a first data channel at a point when a phase difference is generated between the pattern signal in the first data channel and a pattern signal in a second data channel, said channels having a skew. The determination circuit serves to detect the level of a signal in the first data channel at a point when the skew between the first and second data channel causes the phase difference. Accordingly, the later data channel which receives data later than the other data channel can be identified by the level (high or low) of a signal in the first data channel.

The determination circuit may be implemented by: an exclusive OR gate capable of detecting a difference in level between a pair of pattern signals, said difference being caused by a phase difference in first and second data channels having a skew; and a flip-flop circuit capable of receiving an output of the exclusive OR gate at a clock terminal and a pattern signal in the first data channel at a data terminal. This type of the determination circuit allows the exclusive OR gate to output a high level pulse signal corresponding to the skew generated between the first and second data channels. The duration or length of the pulse signal serve to represent the phase difference between the pattern signals, namely, the length of the skew. The flip-flop circuit serves to store the later data channel. Here, parallel synchronous pattern signals are preferably transferred in the first and second data channels.

The determination circuit may further comprise a further flip-flop circuit between the output of the exclusive OR gate and the clock terminal for switching over high level and low level signals at the clock terminal in response to rise in the output of the exclusive OR gate. The further flip-flop circuit serves to identify a later data channel even when the later data channel shifts from one data channel to the other.

The pattern signal in the first data channel may be supplied via a delay circuit to the data terminal in the aforementioned determination circuit. The delay circuit serves to reliably identify a later data channel irrespective of the transmission delay inevitably generated in the exclusive OR gate and the flip-flop circuit.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENTS

Figure 1:
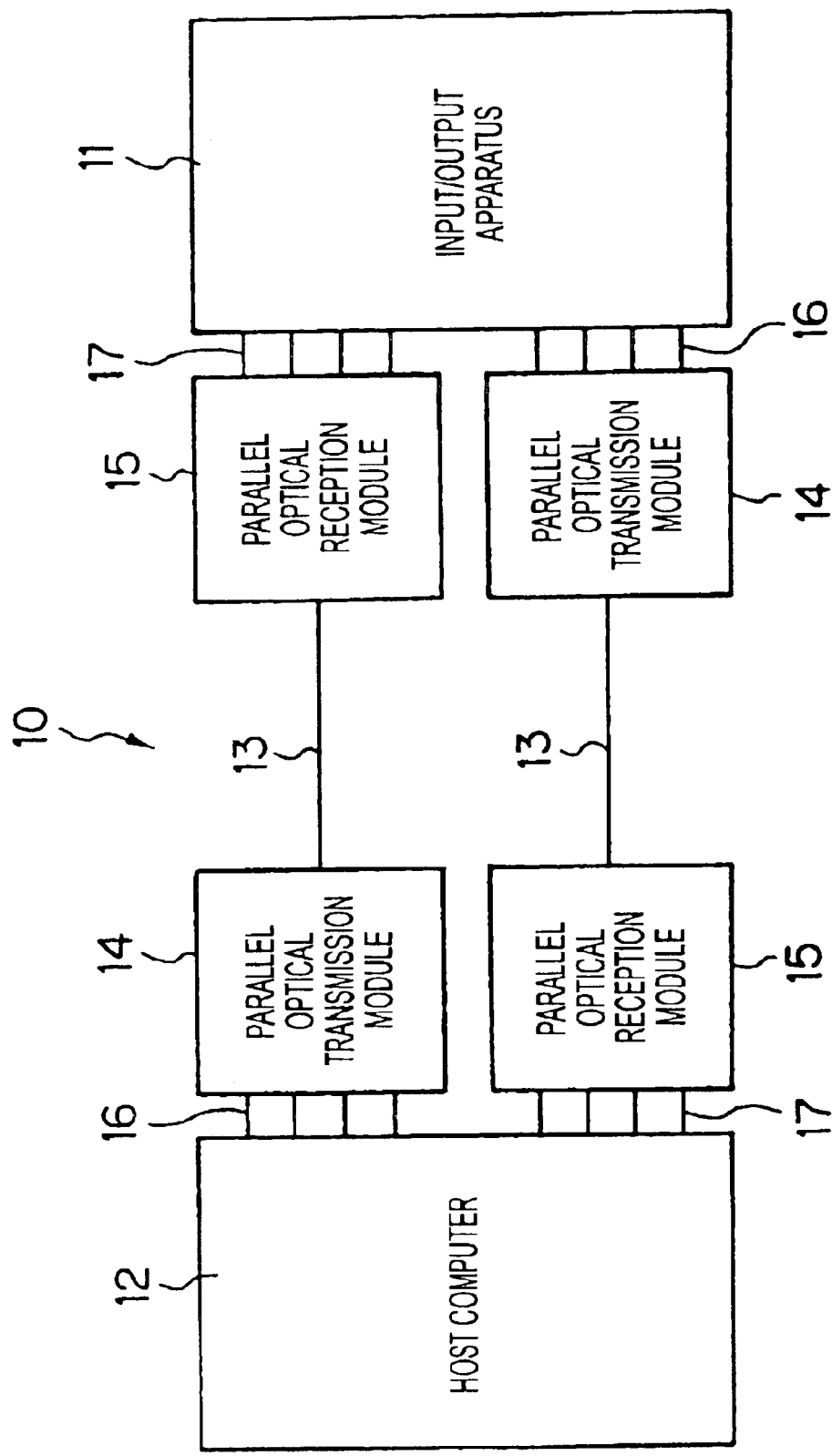
FIG. 1 is a block diagram illustrating an example of a computer system.

FIG. 1 illustrates an example of a computer system using parallel optical transmission in data transfer. The computer system 10 comprises a host computer 12 for calculating or processing data taken out from an input/output apparatus 11.

The host computer 12 may be operated by manual operation to a keyboard and/or a mouse, not shown, in the aid of visual display on a screen, not shown. The input/output apparatus 11 may, for example, be a magnetic tape control apparatus, a file control apparatus with a plurality of disk drive units, and the like.

The host computer 12 is connected to the input/output apparatus 11 through optical fiber ribbon or tape fibers 13. Optical signals transmitted from parallel optical transmission modules 14 in the host computer 12 and the input/output apparatus 11 are received, via the optical fiber ribbons 13, by corresponding parallel optical reception modules 15 in the host computer 12 and the input/output apparatus 11. Parallel optical transmission in data transfer can be implemented by cooperation of the optical fiber ribbons 13, the parallel optical transmission modules 14 and the parallel optical reception modules 15. The parallel optical transmission and reception modules 14, 15 may be assembled in the host computer 12 and the input/output apparatus 11, or be detachably attached to the host computer and the input/output apparatus 11.

Here, data channels for transmission may comprise output ports 16 of the host computer 12, optical fibers corresponding to the output ports 16 in the optical fiber ribbon 13, and input ports 17 corresponding to the optical fibers in the input/output apparatus 11. Data channels for reception may comprise output ports 16 of the input/output apparatus 11, optical fibers corresponding to the output ports 16 in the optical fiber ribbon 13, and input ports 17 corresponding to the optical fibers in the host computer 12. Otherwise, a common single optical fiber ribbon may include data channels for both transmission and reception.

Figure 2:
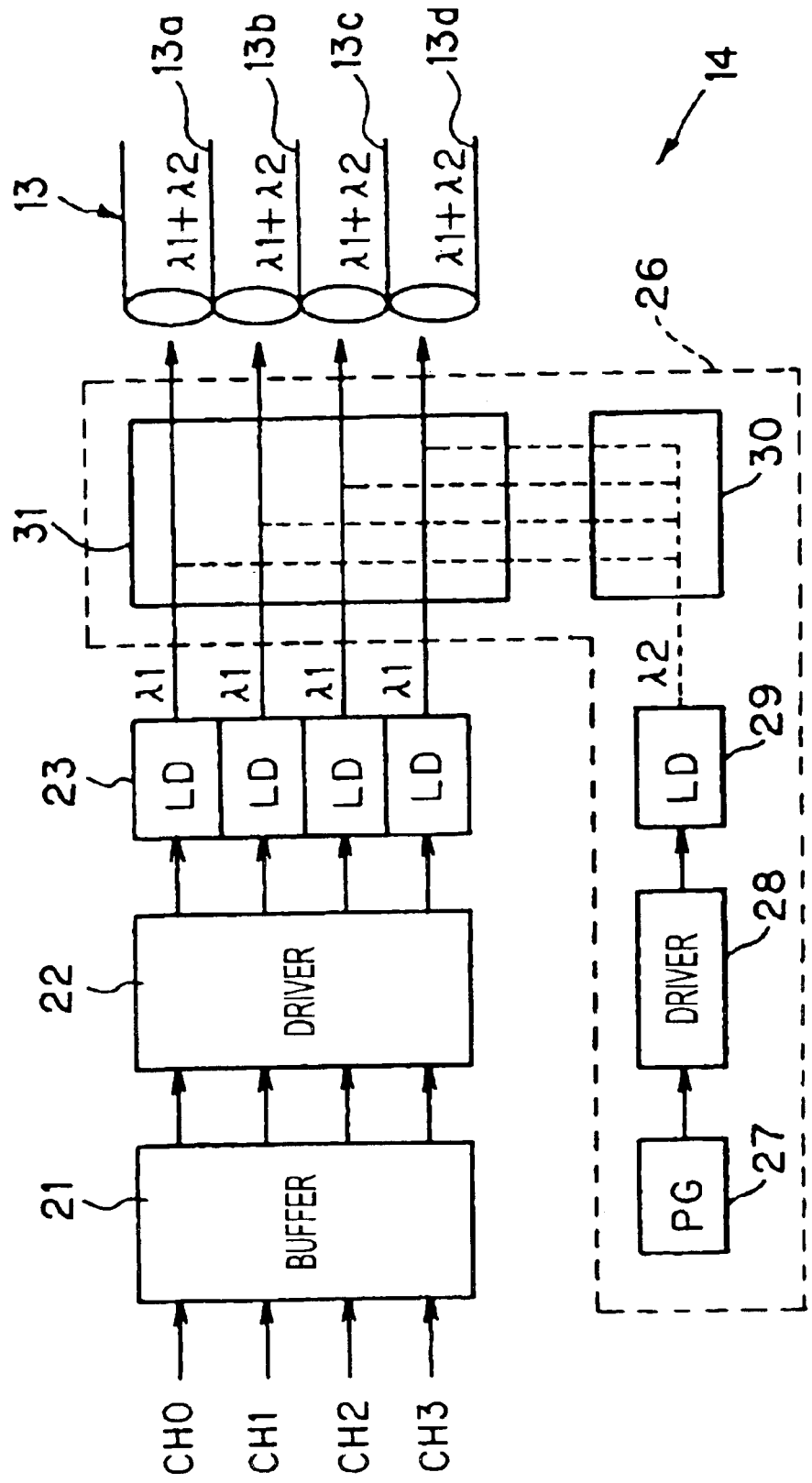
FIG. 2 is a block diagram illustrating the structure of a parallel optical transmission module according to a first embodiment of the present invention.

As shown in FIG. 2, the parallel optical transmission module 14 according to a first embodiment of the present invention comprises four data channels CH0–CH3 extending from the output ports 16 to the corresponding optical fibers 13a–13d in the optical fiber ribbon 13. Binary electric data signals are synchronized by a buffer 21 and then supplied to a driver 22 in the respective data channels CH0–CH3. The driver 22 serves to blink laser diodes (LD) in a laser array 23 in accordance with binary representations "0" and "1." The blink of the laser diodes (LD) forms optical data signals λ1. The flash of the laser diodes (LD) may correspond to either one of binary representation "0" or "1."

A skew data transmission unit 26 is connected to the data channels CH0–CH3 for transmitting optical pattern signals of synchronous phase. The skew data transmission unit 26 comprises a pulse generating circuit 27 which keeps outputting binary electric pattern signals which varies periodically. The output binary electric pattern signals are supplied to a driver 28. The driver 28 serves to blink a laser diode (LD) 29 in accordance with binary representations "0" and "1" so as to generate optical pattern signals λ2.

An optical divider 30 serves to distribute the optical pattern signals λ2 for four branches corresponding to the respective data channels CH0–CH3. An optical mixer 31 then serves to introduce the distributed optical pattern signals λ2 into the respective data channels CH0–CH3. The optical pattern signals λ2 of the identical phase are transmitted into the data channels CH0–CH3, respectively. The optical pattern signals λ2 may be multiplexed onto the data signals λ1 by the aid of the optical mixer 31 so as to provide multiplexed optical signals λ1+λ2. In any event, it is preferable to provide optical pattern signals λ2 of a wavelength different from that of the optical data signals λ1.

Figure 3:
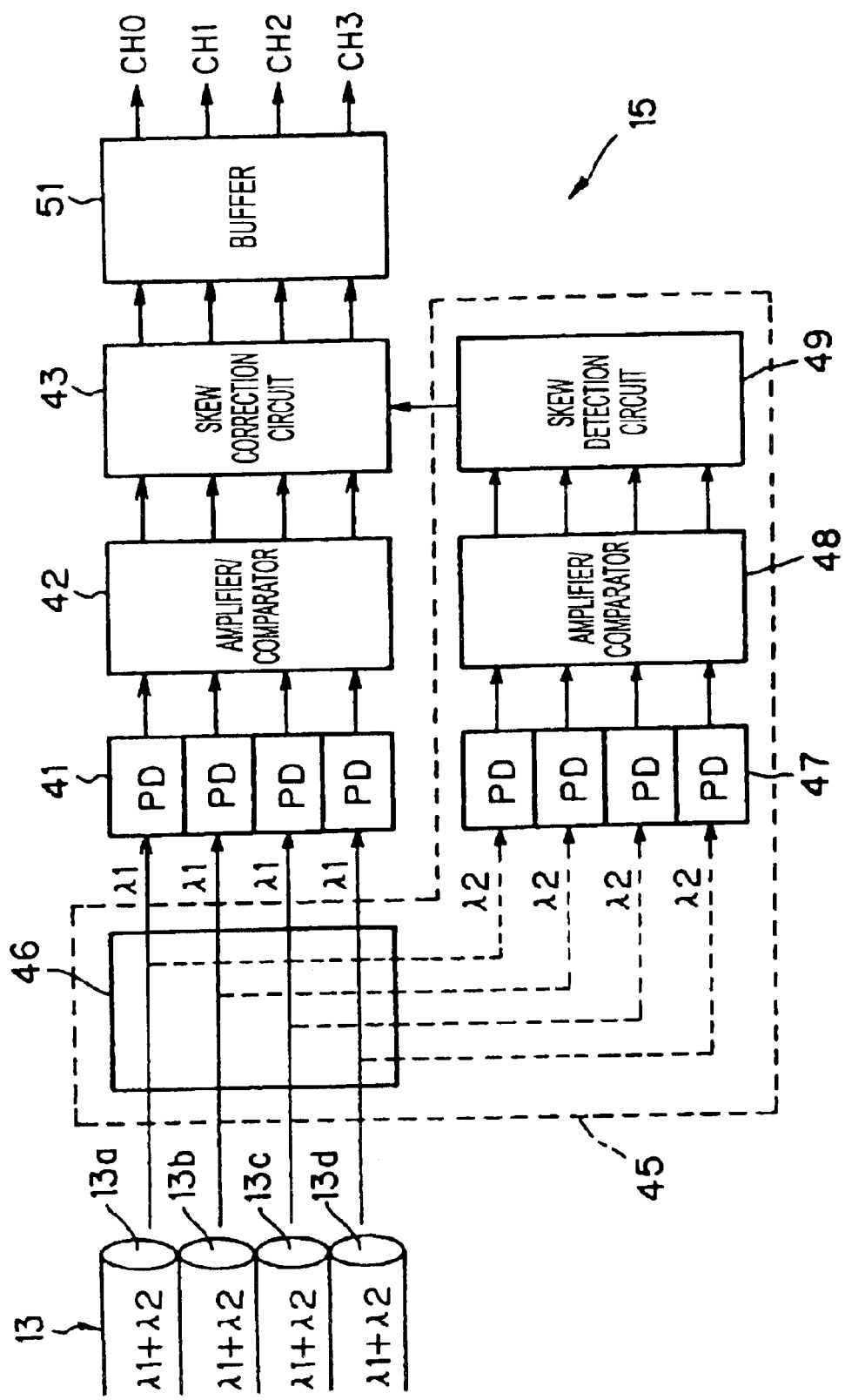
FIG. 3 is a block diagram illustrating the structure of a parallel optical reception module according to the first embodiment of the present invention.

As shown in FIG. 3, the parallel optical reception module 15 according to the first embodiment of the present invention comprises four data channels CH0–CH3 extending from the optical fibers 13a–13d in the optical fiber ribbon 13 to the corresponding input ports 17. Photodetectors (PD) 41 serve to convert the received optical data signals λ1 into electric data signals in the respective data channels CH0–CH3. The electric data signals are amplified and compared with a predetermined threshold voltage value by an amplifier/comparator 42. The comparison in the amplifier/comparator 42 is adapted to restore original binary electric data signals based on the blink of the optical data signals λ1. The restored electric data signals are supplied to a skew correction circuit 43.

A skew data reception unit 45 is connected to the data channels CH0–CH3 for taking out the optical pattern signals λ2, which are supposed to include the identical phase if there is no skew, so as to detect skews between the data channels CH0–CH3 on the basis of the optical pattern signals λ2. The skew data reception unit 45 comprises an optical separator 46 for separating the optical pattern signals λ2 from the multiplexed optical signals λ1+λ2 in the respective data channels CH0–CH3. Since the wavelength of the optical pattern signals λ2 are different from that of the optical data signals λ1, the separator 46 may easily separate the signals λ1, λ2 from each other. Photodetectors (PD) 47 serve to convert the obtained optical pattern signals λ2 into electric signals, which are in turn restored into binary skew data signals by the aid of an amplifier/comparator 48. The binary skew data signals are supplied to a skew detection circuit 49.

The skew detection circuit 49 serves to determine a data channel CH0–CH3 which has received the pattern signal λ2 latest and detect skews for the other data channels based on the determined data channel, as described later. The determined data channel is called "latest data channel" hereinafter. The skew correction circuit 43 serves to eliminate the skews in the electric data signals based on the detected skews, as described later. The electric data signals without skews are synchronized in a buffer 51 and supplied to the input ports 17.

Figure 4:
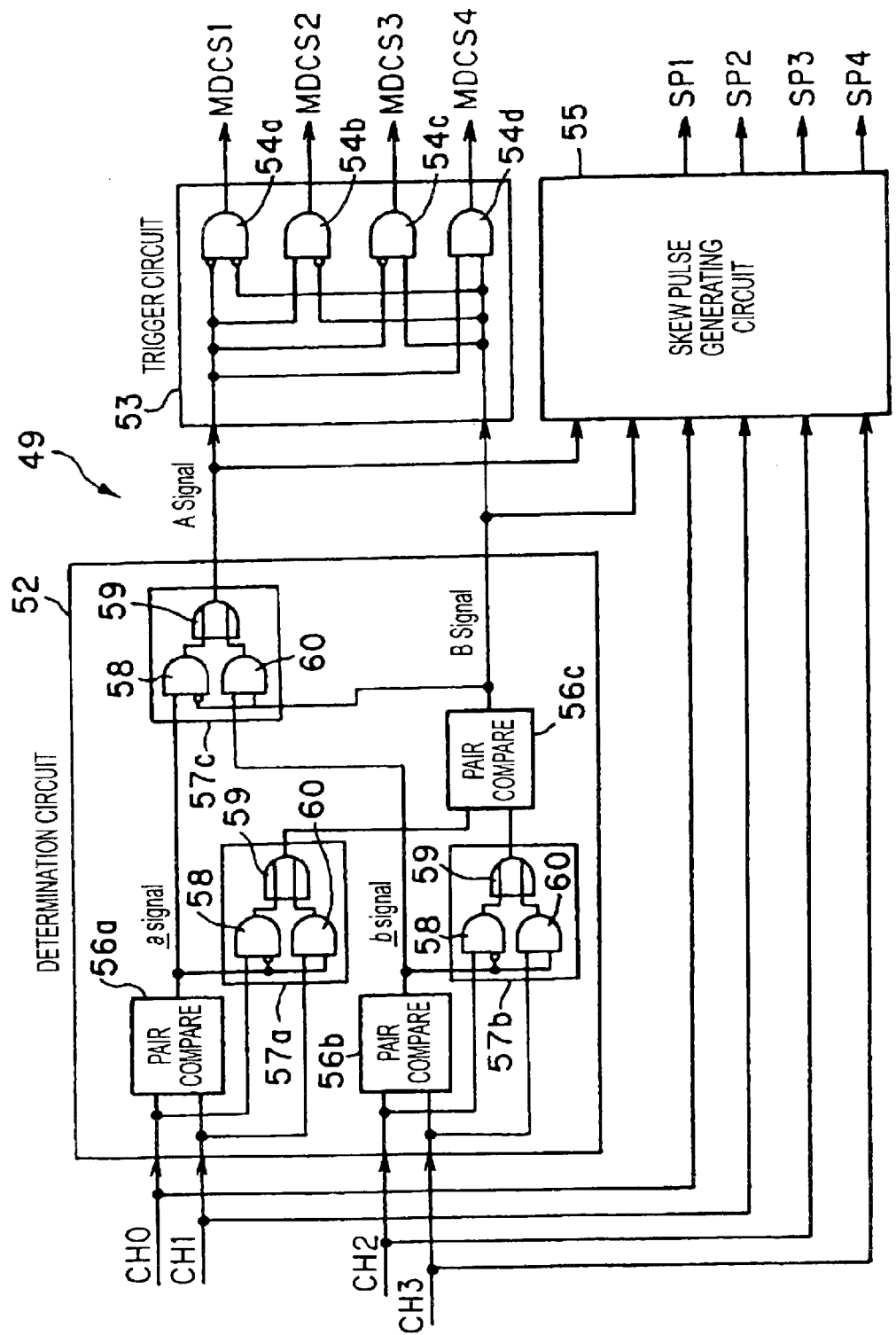
FIG. 4 is a block diagram illustrating the structure of a skew detection circuit.

The skew detection circuit 49 will be described more in detail referring to FIG. 4. The skew detection circuit 49 comprises a determination circuit 52 for determining the latest data channel among the data channels CH0–CH3 based on the received skew data signals. The determination circuit 52 specifies the latest data channel by binary signals such as A and B signals. When the first data channel CH0 is determined as the latest data channel, the A and B signals of low level are output. When the second data channel CH1 is determined as the latest data channel, the A signal of high level and the B signal of low level are output. Likewise, the A signal of low level and the B signal of high level are output when the third data channel CH2 is determined as the latest data channel, and the A and B signals of high level are output when the fourth data channel CH3 is determined as the latest data channel.

A trigger circuit 53 serves to convert the combination of the A and B signals into four latest channel signals MDCS1–MDCS4. Specifically, any one of the latest channel signals MDCS1–MDCS4 is raised up to a high level for the latest data channel specified by the combination of the A and B signals. An AND gate 54a takes high level as a result of two inverted inputs only if the A and B signals both take low level. An AND gate 54b takes high level as a result of the inverted B signal only if the A signal of high level and the B signal of low level are supplied. Likewise, an AND gate 54c takes high level only if the A signal of low level and the B signal of high level are supplied. An AND gate 54d takes high level only if the A and B signals both take high level.

A skew pulse generating circuit 55 serves to output skew pulse signals SP1–SP4 for the respective data channels CH0–CH3 based on the skew data signals for the data channels CH0–CH3 and the A and B signals, as described later. The skew pulse signals SP1–SP4 correspond to the magnitude of the skews for the respective data channels CH0–CH3.

Here, the determination circuit 52 will be described more in detail referring to FIG. 4. The determination circuit 52 comprises first to third pair phase comparators 56a, 56b, 56c for determining one of a pair of the data channels which has received the skew data signal later. The determined data channel is called "later data channel" hereinafter. When the first pair phase comparator 56a determines the later data channel, a first select circuit 57a supplies the skew data signal for the determined data channel to the third pair phase comparator 56c. When the second pair phase comparator 56b determines the later data channel, a second select circuit 57b supplies the skew data signal for the determined data channel to the third pair phase comparator 56c. When the third pair phase comparator 56c determines the later data channel, a third select circuit 57c serves to select one of the outputs from the first and second pair phase comparators 56a, 56b.

For example, the first pair phase comparator 56a outputs an a signal of low level when it determines the first data channel CH0 as the later data channel, while it outputs the a signal of high level when it determines the second data channel CH1 as the later data channel. The second pair phase comparator 56b outputs a b signal of low level when it determines the third data channel CH2 as the later data channel, while it outputs the b signal of high level when it determines the fourth data channel CH3 as the later data channel.

When the first select circuit 57a receives the a signal of low level, an AND gate 58 maintains an activated status with the inverted input, so that the skew data signal of the first data channel CH0 is output through an OR gate 59. When the a signal of high level is supplied to the first select circuit 57a, an AND gate 60 maintains an activated status so that the skew data signal of the second data channel CH1 is output through the OR gate 59. Likewise, the reception of the b signal at low level allows the skew data signal of the third data channel CH2 to be output from the second select circuit 57b, while the reception of the b signal at high level allows the skew data signal of the fourth data channel CH3 to be output.

The third pair phase comparator 56c serves to compare the phases of the skew data signals from the first and second select circuits 57a, 57b. If any of the first and second data channels CH0, CH1 is determined as the later data channel, the B signal of low level is output. If any of the third and fourth data channels CH2, CH3 is determined as the later data channel, the B signal of high level is output.

When the third select circuit 57c receives the B signal of low level, an AND gate 58 maintains an activated status with the inverted input, so that the a signal is output as the A signal. When the third select circuit 57c receives the B signal of high level, an AND gate 60 maintains an activated status, so that the b signal is output as the A signal. In this way, four sets of combination for the level of the A and B signals serve to specify the latest data channel.

Figure 5:
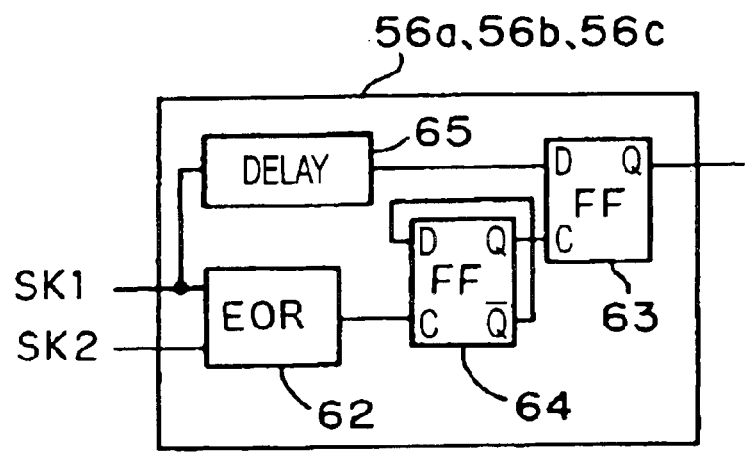
FIG. 5 is a block diagram illustrating the structure of a pair phase comparator.

Referring to FIG. 5, the pair phase comparators 56a, 56b, 56c, namely, determination circuits for the later data channel will be described more in detail. The pair phase comparators 56a, 56b, 56c comprise an exclusive OR gate 62 receiving the first and second skew data signals SK1, SK2. The output from the exclusive OR gate 62 is directed to the clock terminal a of a first flip-flop circuit 63. A second flip-flop circuit 64 is interposed between the output of the exclusive OR gate 62 and the clock terminal C for alternately switching the output signal between low and high levels in response to the rise in the output of the exclusive OR gate 62. The data terminal D of the first flip-flop circuit 63 receives the skew data signals SK1 delayed by a delay circuit 65.

Figure 6:
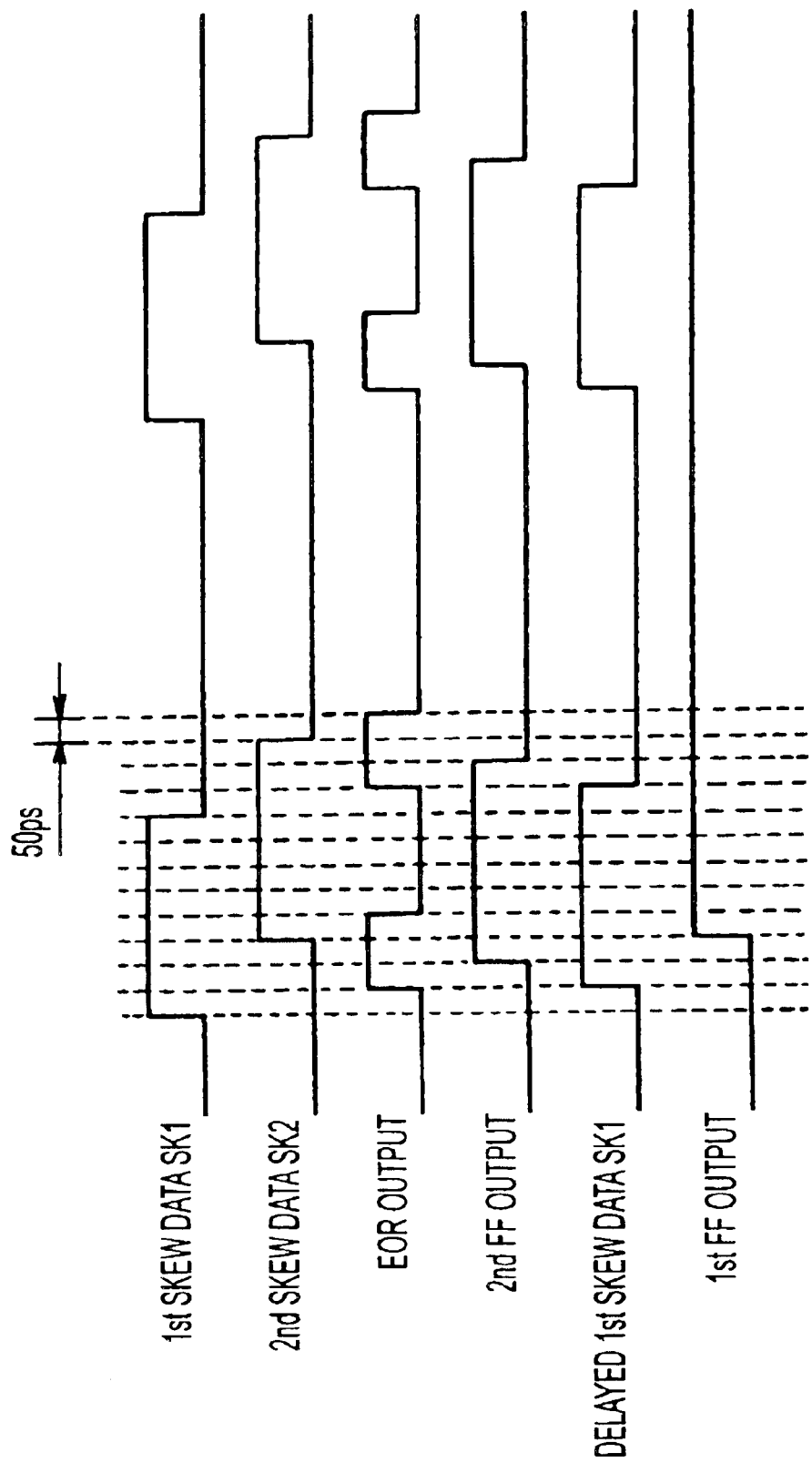
FIG. 6 is a time chart illustrating the operation of the pair phase comparator in case where the first skew data reaches earlier than the second skew data.

Assume that the first pair phase comparator 56a receives the pattern signal of 400 ps pulse width, for example as shown in FIG. 6. When a high level pulse appears in the second skew data signal SK2 150 ps later than the first skew data signal SK1, the exclusive OR gate 62 outputs a high level signal having a duration corresponding to a skew of 150 ps. The delay of 50 ps is inevitably brought to the rise in the output of the exclusive OR gate 62 with respect to the rise in the first skew data signal SK1 because of the transmission rate of the exclusive OR gate 62. The output from the exclusive OR gate 62 serves to raise the output of the second flip-flop circuit 64. The second flip-flop circuit 64 keeps the output at high level until it receives another high level signal from the exclusive OR gate 62. Accordingly, the second flip-flop circuit 64 keeps outputting the high level signal until the first skew data signal SK1 turns to low level from high level. The high level signal is supplied to the clock terminal C of the first flip-flop circuit 63.

At a point when the clock terminal C of the first flip-flop circuit 63 receives the high level signal, the data terminal D is supposed to have received the first skew data signal SK1 from the delay circuit 65, so that the high level signal included in the first skew data signal SK1 is transmitted through the first flip-flop circuit 63 as an output signal. In this way, a high level signal is output from the first flip-flop circuit 63 if delay is found in the second skew data signal SK2.

Figure 7:
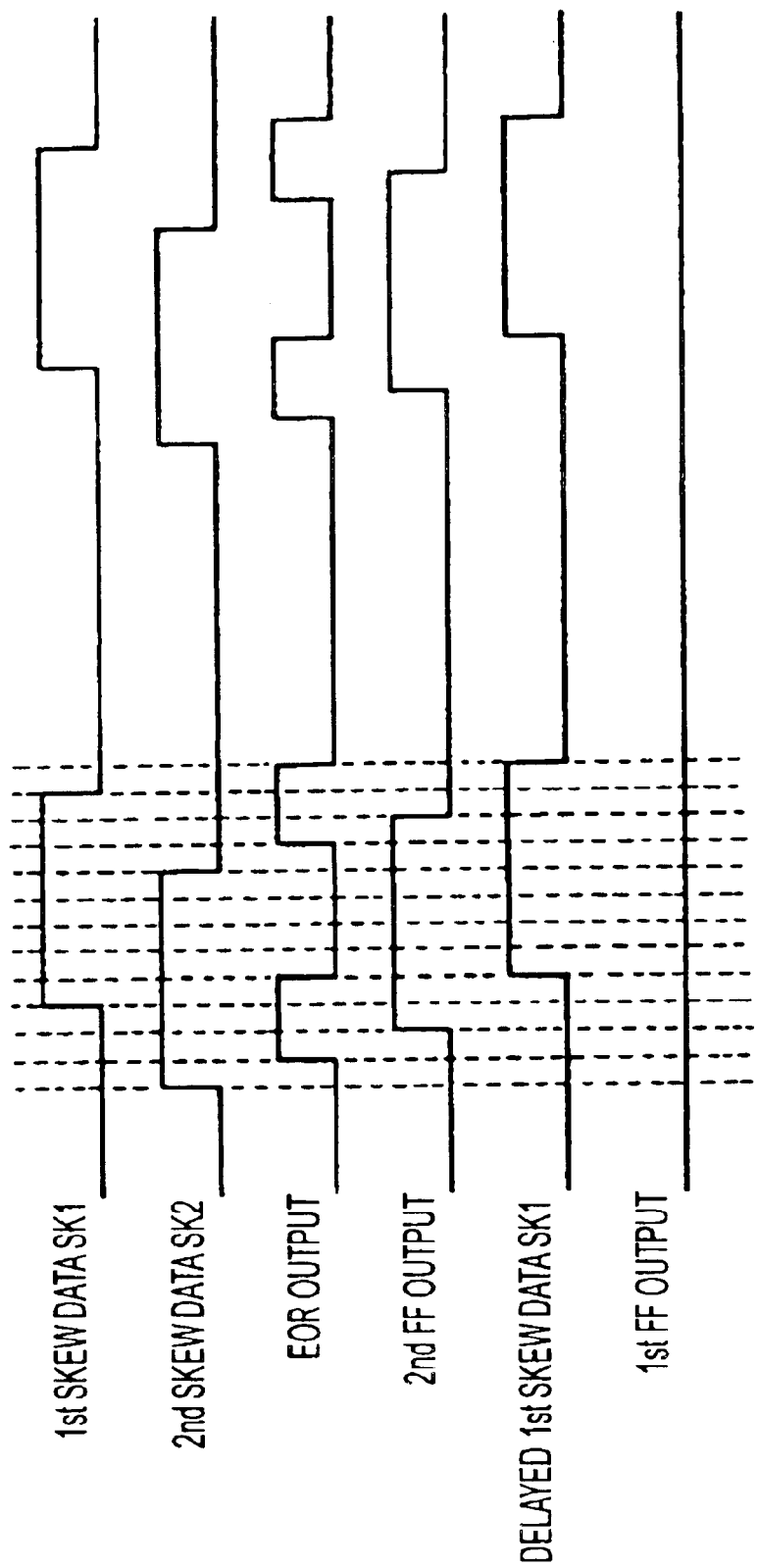
FIG. 7 is a time chart illustrating the operation of the pair phase comparator in case where the second skew data reaches earlier than the first skew data.

To the contrary, as shown in FIG. 7, when a high level pulse appears in the first skew data signal SKI 150 ps later than the second skew data signal SK2, the exclusive OR gate 62 outputs a high level signal having a duration corresponding to a skew of 150 ps. In the same manner as described above, the high level signal from the second flip-flop circuit 64 is supplied to the clock terminal C of the first flip-flop circuit 63. However, at a point when the rise appears in the second skew data signal SK2, the first skew data signal SK1 is supposed to have kept low level. Accordingly, the low level signal included in the first skew data signal SK1 is transmitted through the first flip-flop circuit 63 as an output signal. In this way, a low level signal is output from the first flip-flop circuit 63 if delay is found in the first skew data signal SK1. Here, the delay circuit 65 is provided in view of the transmission rate of the exclusive OR gate 62 and the second flip-flop circuit 64, so that a low level signal in the first skew data signal SK1 is supplied to the data terminal D of the first flip-flop circuit 63 even if the first skew data signal SK1 rises immediately after the rise in the second skew data signal SK2.

Figure 8:
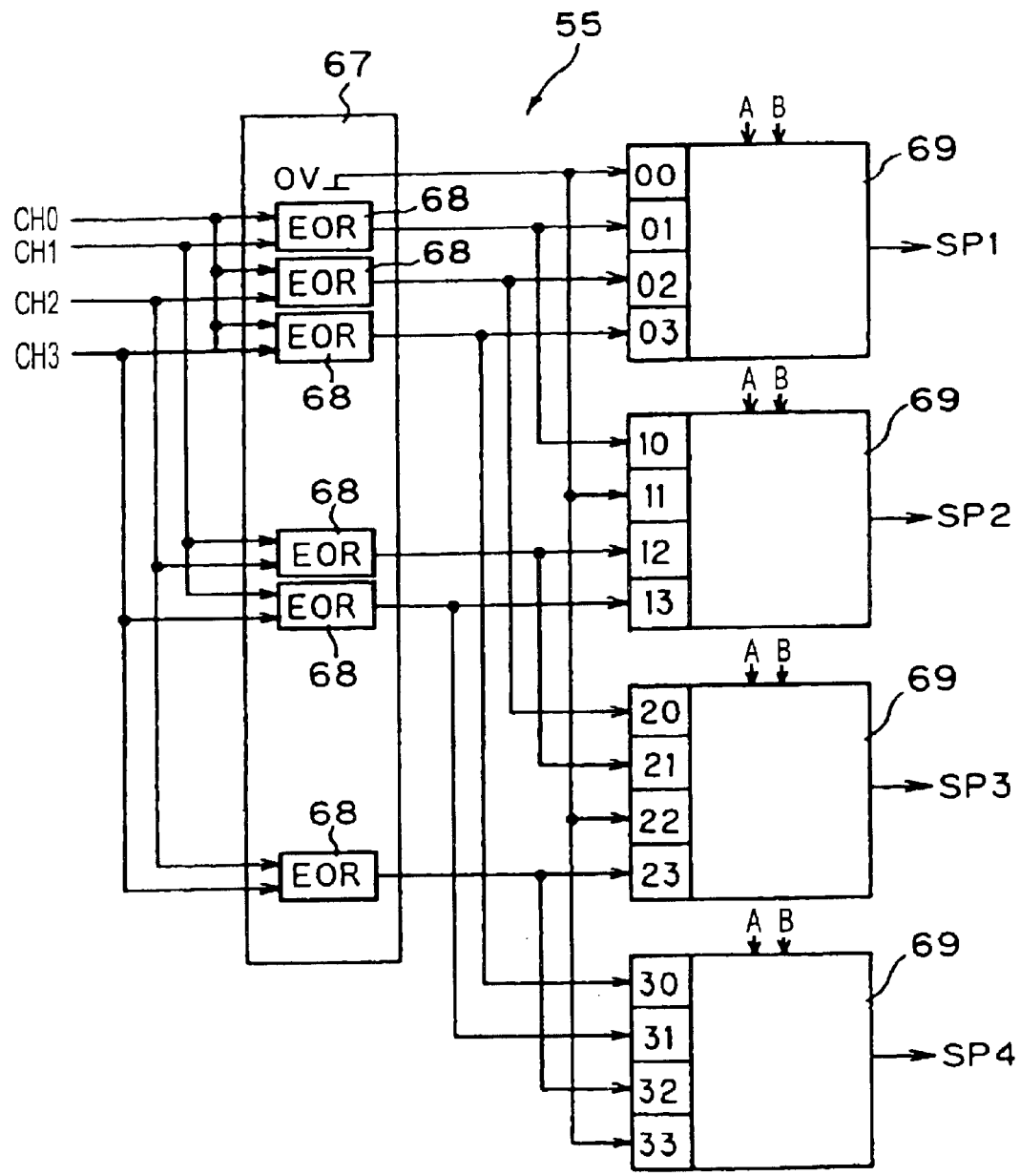
FIG. 8 is a block diagram illustrating the structure of a skew pulse generating circuit.

Next, the skew pulse generating circuit 55 will be described more in detail referring to FIG. 8. The skew pulse generating circuit 55 comprises a skew length detecting circuit 67 for detecting the length of a skew for every combination of a pair of the data channels CH0–CH3. Ten combinations may be considered in this embodiment. The voltage of "0" is set to the length of "0" for any combination of the identical data channels CH0–CH3 which exhibits no skew. Each exclusive OR gate 69 finds out the length of a skew for the remaining combinations of the data channels CH0–CH3. These exclusive OR gates 68 serve to output high level pulses having a duration corresponding to the length of skews in the same manner as described referring to EOR output in FIGS. 6 and 7.

Figure 9:
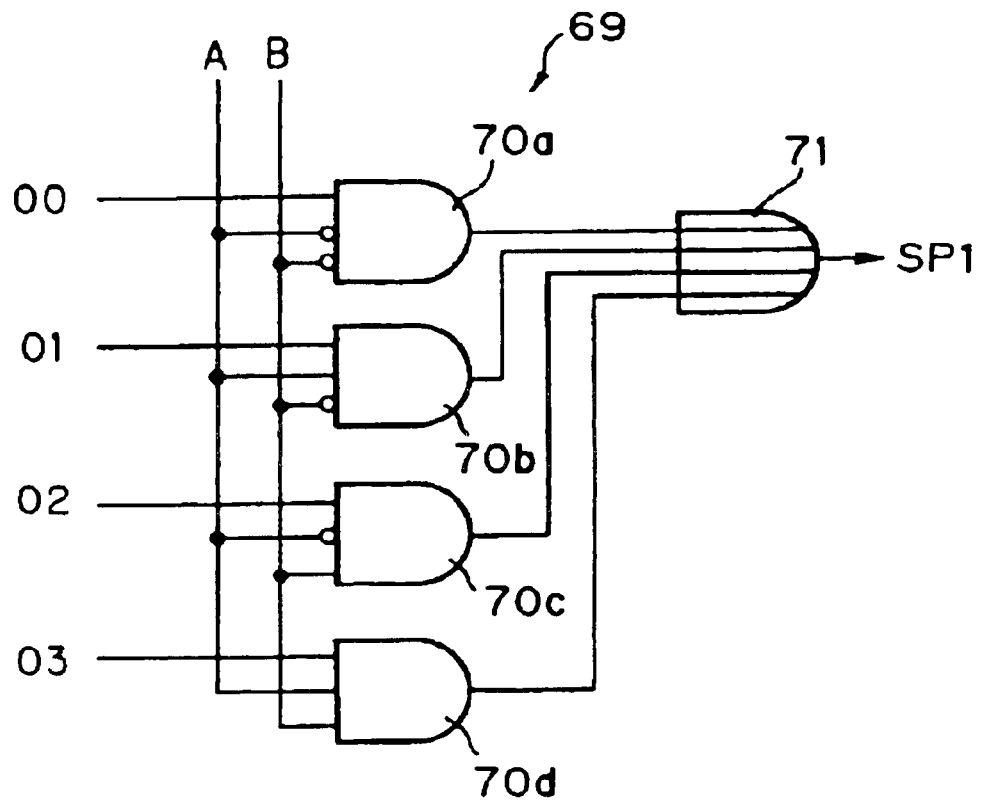
FIG. 9 is a block diagram illustrating the structure of a skew length select circuit.

Skew length select circuits 68 serve to select combinations, required in skew correction, among the full combinations of the data channels CH0=CH3, and to supply the selected combinations to the skew correction circuit 43. For example, when the first data channel CH0 is determined as the latest data channel, the skew length select circuits 69 serve to output the voltage of "0" or the output from the exclusive OR gates 68 all input to [00], [10], (20] and [30] terminals as skew pulse signals SP1–SP4. AND gates 70a–70d in the skew length select circuit 69 receive the A and B signals as shown in FIG. 9. If the A and B signals both take low level, the first AND gate 70a assume an activated status so as to allow a signal at the (00) terminal to be transmitted through an OR gate 71. Likewise, when the second data channel CH1 is determined as the latest data channel, signals at [01], (11], [21] and [31] terminals are output. Otherwise, signals at [02], [12], [22] and [32] terminals are output when the third data channel CH2 is determined as the latest data channel, and signals at [03], [13], [23] and [33] terminals are output when the fourth data channel CH4 is determined as the latest data channel.

Figure 10:
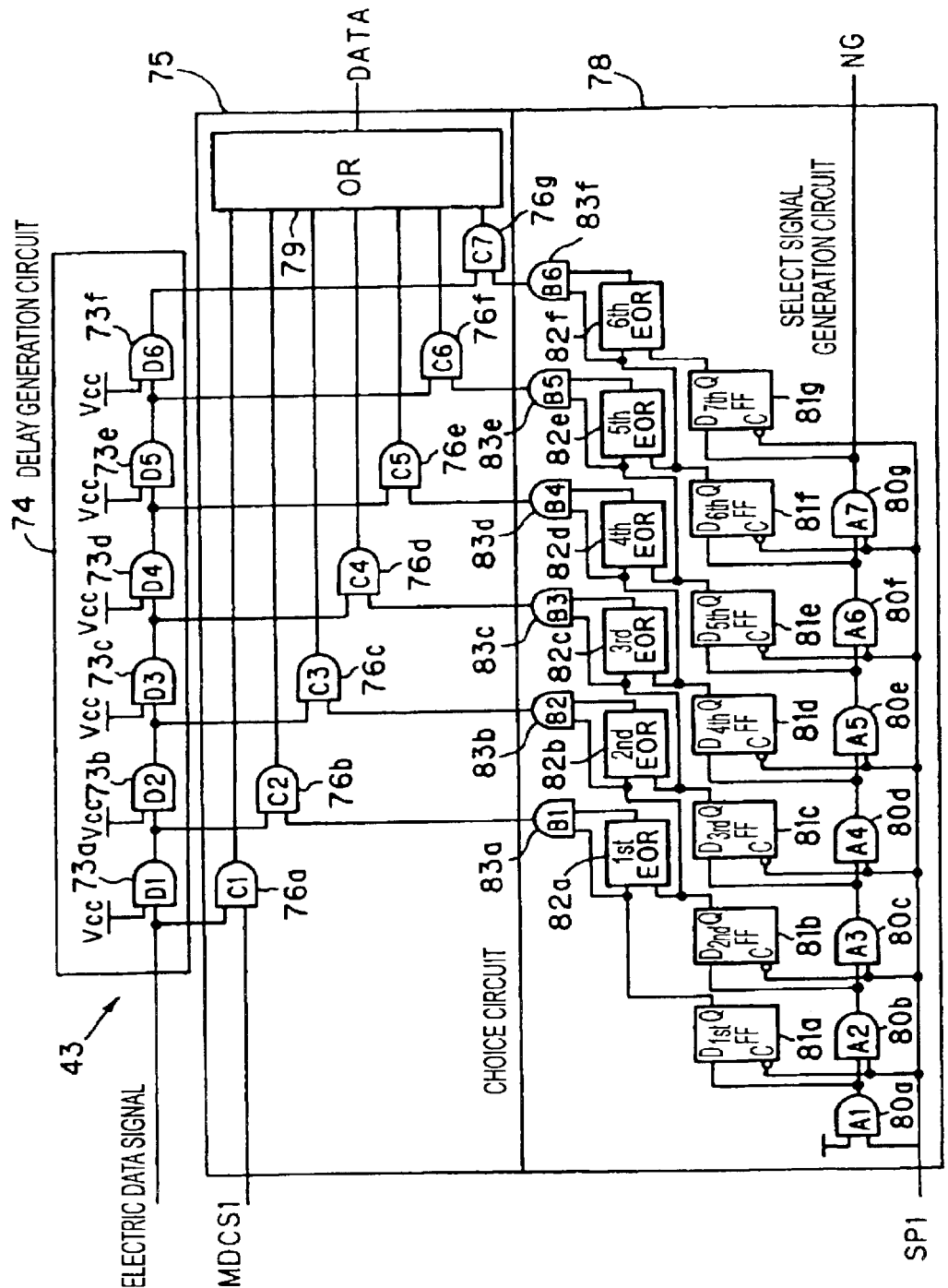
FIG. 10 is a block diagram illustrating the structure of a skew correction circuit.

FIG. 10 illustrates the structure of the skew correction circuit 43 provided in the respective data channels CH0–CH3. The skew correction circuit 43 comprises a delay generation circuit 74 formed by a plurality of AND gates 73a–73f (D1–D6) for sequentially transferring the supplied electric data signal. Each AND gate 73a–73f allows delay of 50 ps, for example, for processing. Accordingly, six AND gates 73a–73f are supposed to allow delay of maximum 300 ps in total. The outputs from the AND gates 73a–73f are supplied to a choice circuit 75.

The choice circuit 75 comprises an AND gate 76a(C1) for receiving the electric data signal prior to the reception by the first AND gate 73a, and six AND gates 76b–76g (C2–C7) for receiving the outputs from the AND gates 73a–73f, respectively. The AND gate 76a serves to output the electric data signal in response to a high level signal included in the latest channel signals MDCS1–MDCS4 from the trigger circuit 53. The remaining AND circuits 76b–76g serve to output the electric data signal in response to a high level signal included in a select signal supplied from a select signal generation circuit 78. The electric data signal from the AND gates 76a–76g is output as a skew corrected data signal DATA through an OR gate 79.

The select signal generation circuit 78 comprises a set of delay gates 80a–80g (A1–A7) for applying delay of, for example, 50 ps to the skew pulse signal SP1 passing through the delay gates 80a–80g. The delay gates 80a–80g serve to sequentially output high level signals with the interval of 50 ps after the skew pulse signal SP1 reaches high level. The duration of the skew pulse signal SP1, namely, the duration corresponding to the length of the skew allows the corresponding number of delay gates 80a–80g to take an activated status so as to output a high level signal.

The outputs from the delay gates 80a–80g are supplied to data terminals L) of flip-flop circuits 81a–81g. A high level signals are output only from the flip-flop circuits 81a–81g which receive the high level signal at the data terminal D at a point when the skew pulse signal SP1 is brought down to low level.

Exclusive OR gates 82a–82f serve to compare the outputs from a pair of adjacent flip-flops 81a–81g. Only one of the exclusive OR gates 82a–82f is capable of outputting a high level signal in accordance with the duration of skew pulse signal SP1. The sole output from one of the exclusive OR gates 82a–82f is supplied to the choice circuit 75 via AND gates 83a–83f(B1–B6).

Figure 11:
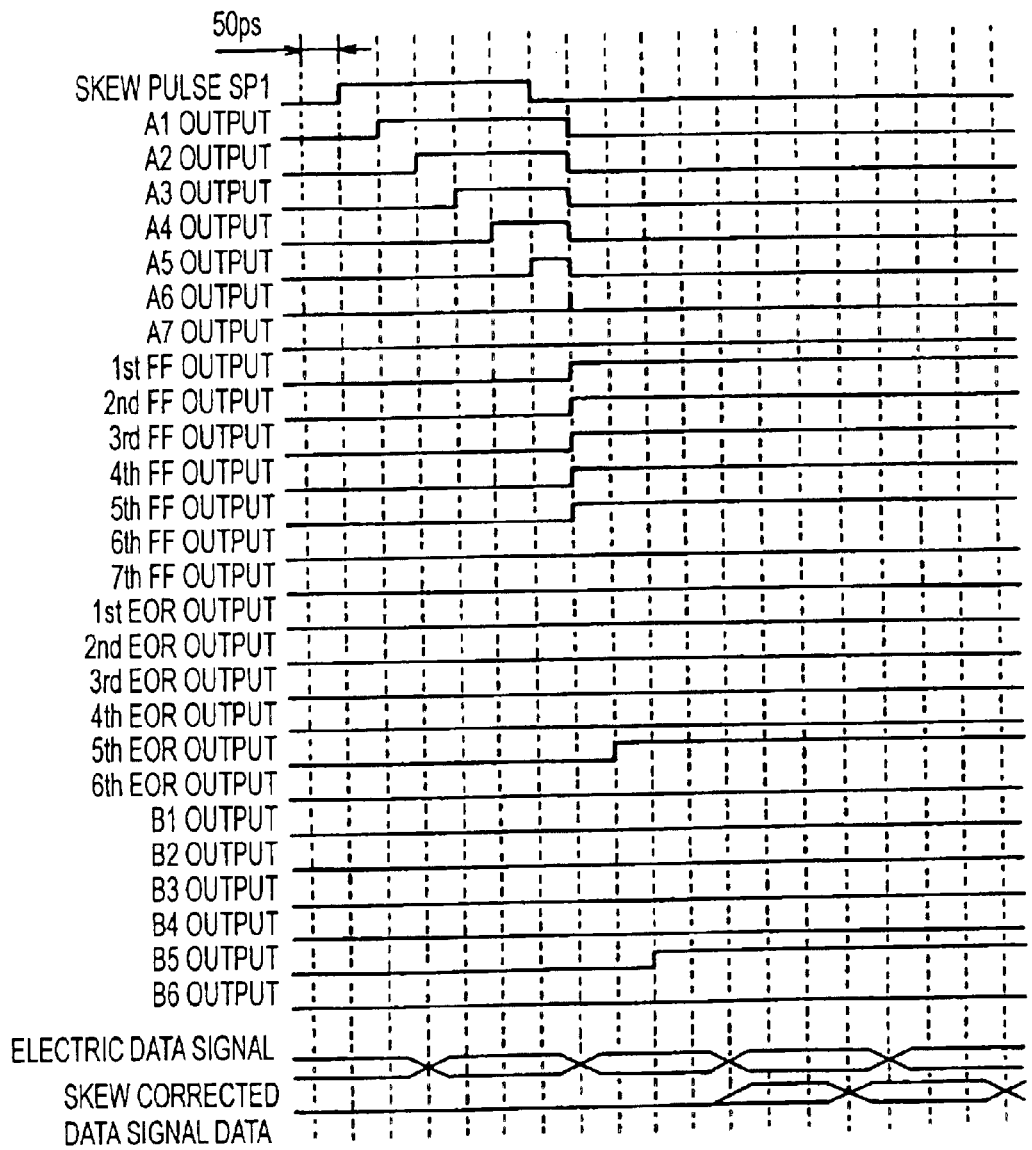
FIG. 11 is a time chart illustrating the operation of the skew correction circuit.

Assume that the skew correction circuit 43 receives a skew pulse signal SP1 having the duration of 250 ps, as shown in FIG. 11. When the skew pulse signal SP1 reaches high level, every delay gate 80a–80g receives a high level signal at one of the input terminals. The transmission rate of gate circuits allows the delay gate 80a to output a high level signal 50 ps after the skew pulse signal SP1 is raised to high level. The delay gates 80a–80g which receive the high level signal from the skew pulse signal SP1 sequentially output a high level signal in this manner. In this case, the delay gates 80a–80f at positions determined by the transmission rate of gate circuits output a high level signal, respectively, for the delay of 250 ps.

The flip-flop circuits 81a–81e which receive the high level signal at the data terminal D from the corresponding delay gates 80a–80f at a point when the skew pulse signal SP1 goes down to low level output a high level signal. The high level signals are kept until the duration of skew pulse signal SP1 changes. Accordingly, only the exclusive OR gate 82f outputs a high level signal until the skew varies. The remaining exclusive OR gates 82a–82e, 82g compare a pair of high level signals or a pair of low level signals, so that the OR gates 82a–82e, 82g fail to output a high level signal.

When the AND gate 76f receives the high level signal from the corresponding exclusive OR gate 82e via the corresponding AND gate 83e, it allows the received electric data signal to transmit to the OR gate 79. The skew corrected data signal DATA is obtained in this manner. The aforementioned process is conducted in all of the data channels other than the data channel which are determined as the latest data channel. On the other hand, the electric data signal without any delay is output from the OR gate 79 in the data channel determined as the latest data channel since the corresponding latest channel signal MDCS1–MDCS4 reaches high level.

Figure 12:
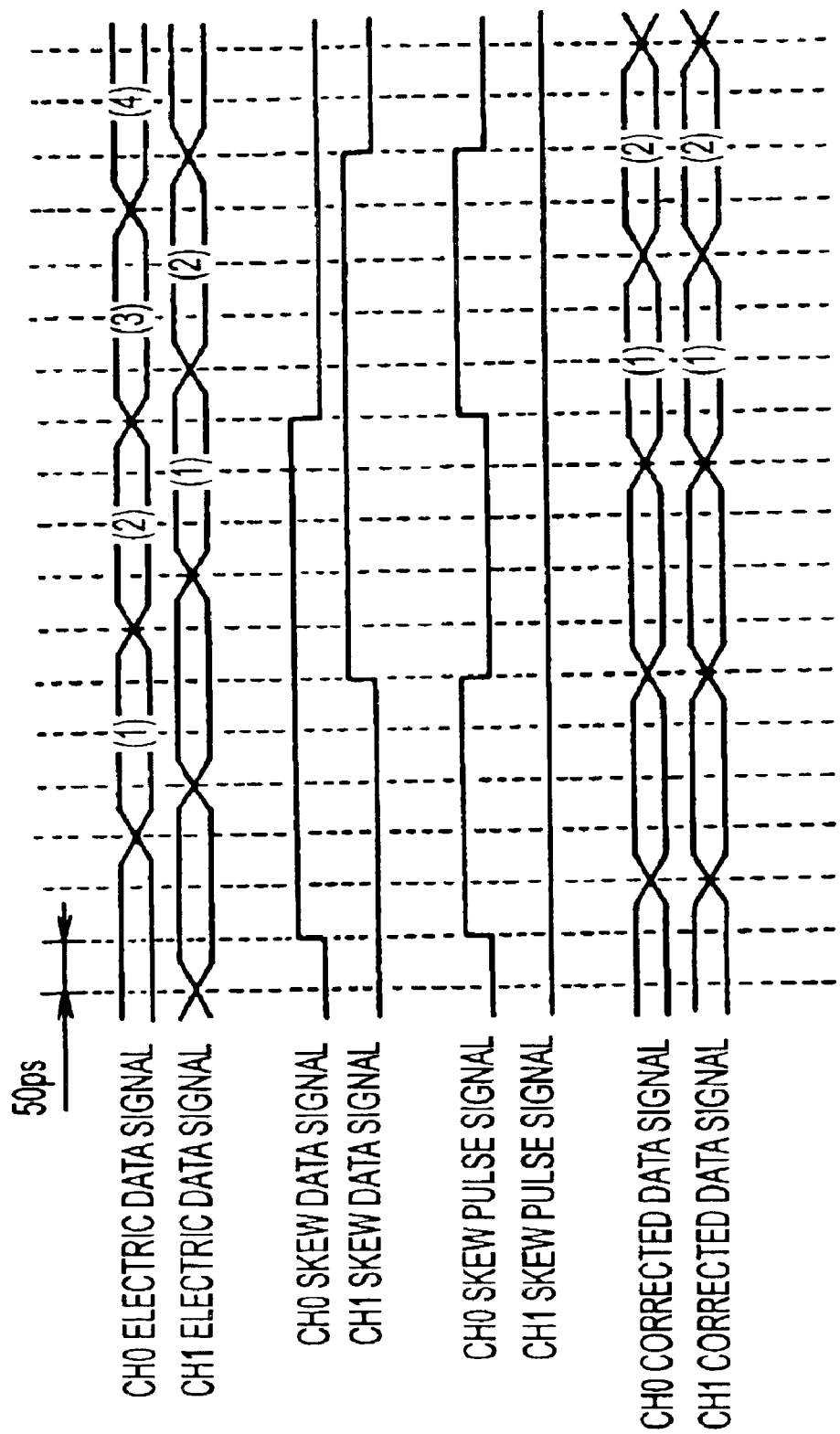
FIG. 12 is a time chart illustrating the operation of the skew correction circuit.

In the above-described manner, data signals DATA without skews are obtained in all of the data channels CH0–CH3 in response to the skew data signal as shown in FIG. 12. Maximum duration of a skew to be corrected may be determined by duration of a pulse and intervals between pulses in a pattern signal, delay time of the AND gates 73a–73f and the delay gates 80a–80g, and the number of the AND gates 73a–73f and the delay gates 80a–80g. Constant transmission of pattern signals serves to accept the variation in skews.

The operation of the skew data transmission unit 26 and the skew data reception unit 45 may be started when the host computer 12 and the input/output apparatus 11 are turned on. In addition, transfer of pattern signals between the skew data transmission unit 26 and the skew data reception unit 45 may be kept irrespective of no transfer of data signals.

Figure 13:
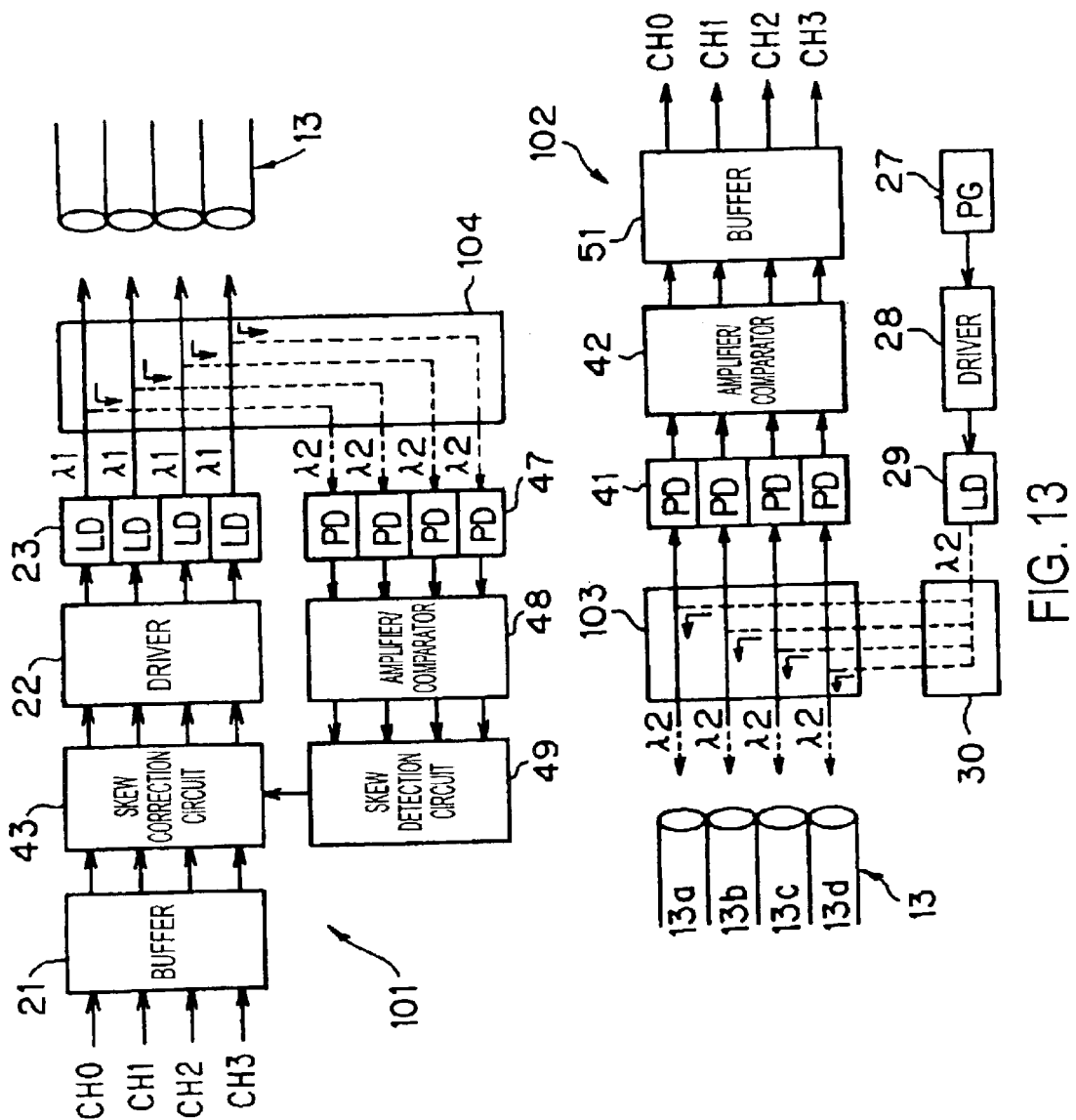
FIG. 13 is a block diagram illustrating the structure of parallel optical transmission and reception modules according to a second embodiment of the present invention.

FIG. 13 illustrates a parallel optical transmission module 101 and a parallel optical reception module 102 according to a second embodiment of the present invention. In this embodiment, an optical pattern signal λ2 is transmitted from the parallel optical reception module 102 to the parallel optical transmission module 101 in transferring optical data signals λ1 between the parallel optical transmission and reception modules 101, 102. The common reference numerals or characters are attached to structures identical to those of the aforementioned first embodiment.

Specifically, an optical pattern signal λ2 generated at the laser diode (LD) 29 is first distributed to four branches corresponding to respective data channels CH0–CH3 by the optical divider 30, and then introduced into the respective optical fibers 13a–13d in the optical fiber ribbon 13 by an optical directional coupler 103. The transmitted optical pattern signals λ2 are supplied to the photodetectors (PD) 47 by the operation of an optical directional coupler 104 in the parallel optical transmission module 101. The optical directional couplers 103, 104 serve to guide lights along specific passages in response to the direction of lights.

The skew detection circuit 49 in the parallel optical transmission module 101 serves to detect the length of skews based on the received optical pattern signals λ2 in the same manner as described above. The skew correction circuit 43 outputs data signals in accordance with the detected length of the skews. The data signal is immediately output from the AND gate 76a, as shown in FIG. 10, in the latest data channel. The longer the length of the skew gets with respect to the latest data channel, the later the data signals are output in the remaining data channels. As a result, the parallel optical reception module 102 simultaneously receives the skew corrected data signals in the respective data channels CH0–CH3.

With the above structure, for example, the host computer 12 is capable of transmitting optical data signals λ1 after it confirms the connection between the host computer 12 and the input/output apparatus 11 by the optical fiber ribbon 13. In this case, it is possible to apply Class 1 regulation in the laser safety regulation to the transmission of optical pattern signals λ2 while applying Class 4 regulation to the transmission of optical data signals λ1, so that larger power may be obtained according to Class 4 regulation for data transmission, and at the same time, reduced requirements can be applied to handling of the modules according to Class 1 regulation. It is possible to realize an open fiber control system.

What is claimed is:

1. A parallel optical transmission module comprising:
   an optical data transmission circuit transmitting parallel data signals through a plurality of parallel data channels; and
   a skew data reception unit capable of taking out parallel pattern signals out of the parallel data channels, said parallel pattern signals are synchronously transmitted from an other side in the parallel data channels such that the pattern signals and data signals coexist on the data channels, said skew data reception unit detecting a skew between the data channels based on the parallel pattern signals, where the detecting is for correcting skew of the parallel data signals.

2. The parallel optical transmission module according to claim 1, wherein said optical data transmission circuit transmits the parallel data signals at timings corrected based on the skew detected by the skew data reception unit so that the parallel data signals reach the other side without the skew.

3. The parallel optical transmission module according to claim 2, said data transmission circuit confirms reception of said parallel pattern signals.

4. A parallel optical reception module comprising:
   an optical data reception circuit receiving parallel data signals through a plurality of parallel data channels; and
   a skew data reception unit capable of taking parallel pattern signals out of the parallel data channels, said parallel pattern signals synchronously transmitted in parallel with the parallel data signals in the respective data channels such that the pattern signals and data signals coexist on the data channels, said skew data reception unit detecting a skew between the data channels based on the parallel pattern signals, where the detecting is for correcting skew of the parallel data signals.

5. The parallel optical reception module according to claim 4, wherein said parallel pattern signals have wavelength different from that of the parallel data signals.

6. The parallel optical reception module according to claim 5, further comprising a skew correction circuit capable of correcting the skew of the data signal based on the skew detected by said skew data reception unit.

7. The parallel optical reception module according to claim 4, further comprising a separator disposed in the parallel data channels so as to extract the parallel pattern signals out of the respective parallel data channels.

8. The parallel optical reception module according to claim 4, wherein the detecting of the skew is performed continuously, and the skew is detected and corrected in the data signal without interruption of the flow of data from the data signal.

9. A parallel optical transmission module comprising:

an optical data transmission circuit transmitting parallel data signals through a plurality of physically separate parallel data channels, each parallel data signal representing a different data stream; and a skew data transmission unit transmitting parallel synchronous pattern signals in parallel with the parallel data signals in the respective data channels such that the pattern signals and data signals coexist on the data channels, where the pattern signals are synchronized with each other, wherein the parallel pattern signals are utilized to detect a skew between the data channels and to correct skew of the parallel data signals at a receiver.

10. The parallel optical transmission module according to claim 9, wherein said parallel pattern signals have wavelength different from that of the parallel data signals.

11. The parallel optical transmission module according to claim 9, further comprising a mixer disposed in the parallel data channels so as to introduce the parallel synchronous pattern signals into the respective parallel data channels.

12. A method, comprising:

sending from a first unit synchronized parallel optical pattern signals in a first direction through parallel optical channels, where passage through the parallel optical channels causes the optical pattern signals to become skewed;

receiving the parallel optical pattern signals at a second unit, where they are compared to each other to generate skew correction information or signals reflecting the skew caused by their passage through the parallel optical channels; and using the skew correction information or signals at the second unit to skew parallel electric data signals, after which they are converted to parallel optical data signals and sent in a second direction through the parallel optical channels, where the second direction is an opposite direction of the first direction, where the skewed parallel optical data signals become de-skewed by their passage through the parallel optical channels, and where the first unit is sending the pattern signals at a same time that the second unit is sending the data signals such that the parallel optical channels carry, at the same time, the data signals and pattern signals passing in opposite directions through the optical channels.

13. A method, comprising:

converting parallel electric data signals to parallel optical data signals;

generating synchronized parallel optical pattern signals;

transmitting the parallel optical pattern signals through parallel optical channels while simultaneously transmitting the parallel optical data signals through the same parallel optical channels, where the parallel optical signals become skewed while passing through the parallel optical channels;

receiving the skewed parallel optical signals at a remote end of the parallel optical channels;

converting the received parallel optical data and pattern signals to parallel electric data and pattern signals;

generating a skew correction signal by comparing the converted parallel electric pattern signals to each other; and applying the skew correction signal to the converted parallel electric data signals, thereby correcting the skew that resulted from the parallel optical signals passing through the parallel optical channels.

14. A parallel optical transmission module comprising:

an optical data transmission circuit transmitting by outputting from the module parallel synchronized data signals into a plurality of physically separate parallel data channels, said parallel data channels external to the module, each parallel data signal representing a different data stream; and a skew data transmission unit transmitting parallel synchronous pattern signals in parallel with the parallel data signals in the respective data channels such that the pattern signals and data signals coexist on the data channels, where the pattern signals are synchronized with each others, wherein the parallel pattern signals are utilized to detect a skew between the data channels and to correct skew of the parallel data signals at a receiver.

* * * * *